Dec. 18, 1956  C. A. LEVERTH, JR  2,774,172
FISHHOOK SPREADER
Filed Sept. 4, 1956
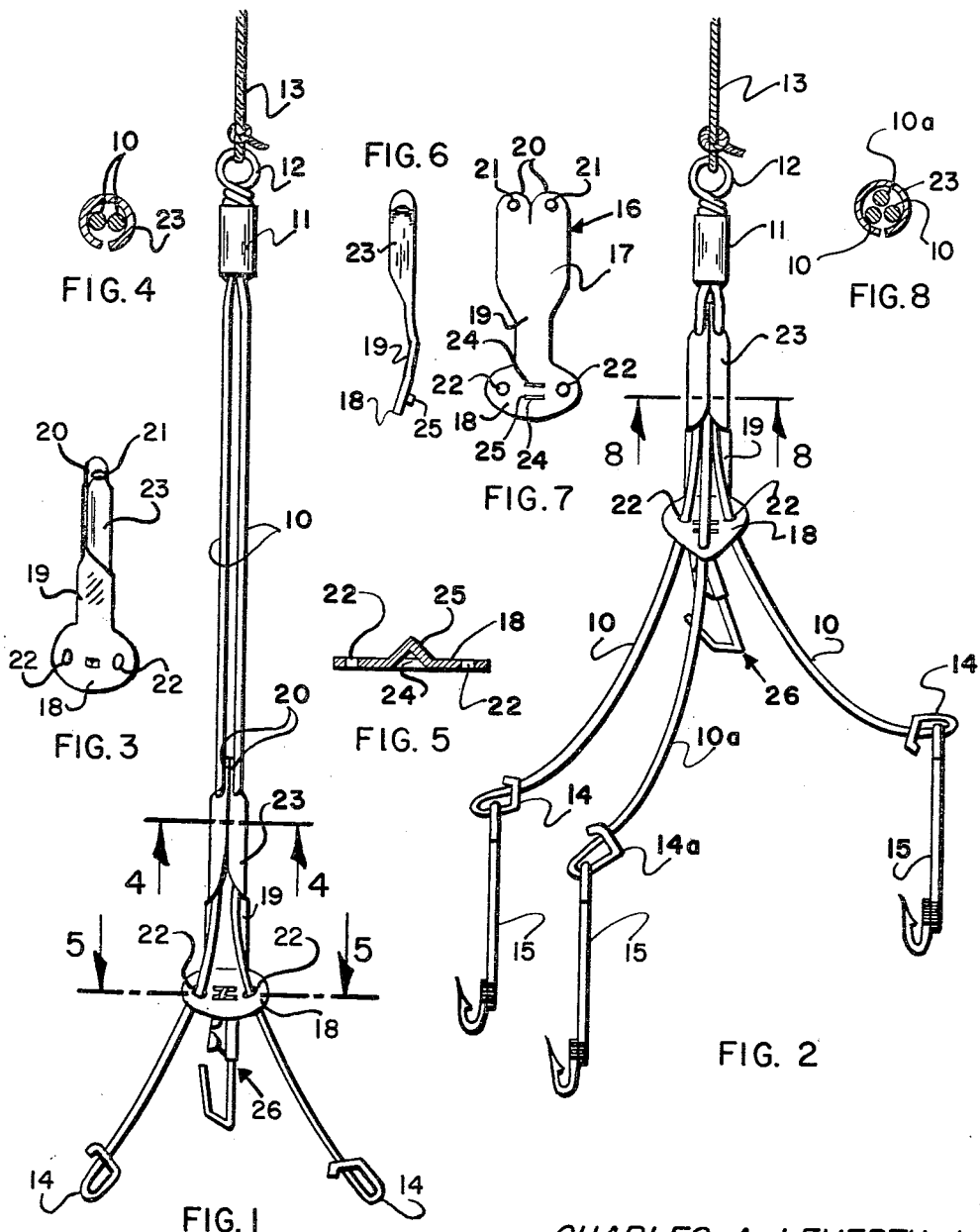
CHARLES A. LEVERTH, Jr.
INVENTOR
BY Felix A. Russell
ATTORNEY

United States Patent Office 2,774,172
Patented Dec. 18, 1956

2,774,172

FISHHOOK SPREADER

Charles A. Leverth, Jr., Bedford, Ohio

Application September 4, 1956, Serial No. 607,860

2 Claims. (Cl. 43—42.74)

The present invention relates to an improved fish hook spreader and it consists in the combinations, constructions and arrangements of parts herein described and claimed.

Generally there is provided a fish hook spreader which is an improvement over my prior Patent No. 2,729,911 dated January 10, 1956. As in my former patent, a plurality of spring wires are connected together at one of their ends and provided at such end with a loop whereby the same may be attached to a fish line. The free ends of each of the wires is provided with means for attaching a conventional fish hook thereto. The device embodying the present invention consists of a vertically extending sleeve having integrally formed ears at the upper end thereof which ears are closely aligned in face-to-face relationship and which are each provided with an opening for the reception therethrough of the spring wires. The lower end of the sleeve has integrally formed therewith a downwardly and outwardly extending arm which has, in turn, formed integrally therewith a downwardly and inwardly extending plate. The plate is provided with openings for the slidable reception therethrough of the aforesaid wire and is also provided with novel means for attaching thereto a snap fastener or the like whereby a sinker may be connected thereto. The device is such that the spreader will effectively remain in selected positions upon the wires and, of course, the purpose of the device is to selectively space the lower ends of the wires and consequently the fish hooks attached thereto.

It is accordingly an object of the invention to provide a novel fish hook spreader having improved means for frictionally maintaining its position upon a plurality of leaders.

Another object of the invention is to provide a device of the character set forth which is simple in construction, inexpensive to manufacture and yet effective and efficient in operation.

Still another object of the invention is to provide a device of the character set forth which may be formed from a single piece of sheet metal.

A further object of the invention is to provide, in a device of the character set forth, novel guide means forming a part of the invention.

Other and further objects of the invention will become apparent from a reading of the following specification taken in conjunction with the drawing, in which:

Figure 1 is a front elevational view of an embodiment of the invention illustrating the same with certain hook-holding means adjacent one another, Figure 2 is a view similar to Figure 1 but showing a modified form the invention may assume and further showing the same with fish hooks attached, Figure 3 is a perspective view of a sleeve, arm and guide plate forming parts of the invention, Figure 4 is a sectional view taken along line 4—4 of Figure 1, Figure 5 is an enlarged sectional view with certain parts removed taken along line 5—5 of Figure 1, Figure 6 is a side elevational view of the device illustrated in Figure 3, Figure 7 is a plan view of a blank utilized in forming certain integral portions of the invention, and Figure 8 is a sectional view taken along line 8—8 of Figure 2.

Referring more particularly to the drawing, there is shown therein, in Figure 1, a pair of elongated outwardly biased spring wires 10 the inner ends of which are soldered or otherwise affixed together, as indicated at 11. Projecting upwardly from the inner ends of the thus mutually mound wires 11 is a loop member 12 to which may be attached a conventional fishing line 13. The outer end of each of the wires 10 is looped upon itself as indicated at 14.

In the modified form of the invention illustrated in Figures 2 and 8, there is shown the identical structure with the exception that there is provided an additional outwardly biased spring wire 10a and the free end of this wire is looped upon itself as indicated at 14a. The loops 14 and 14a may all have attached thereto fish hooks 15.

Referring now to that portion of the invention which constitutes the improvement of the present application, it will be seen that there is provided a blank which is shown in Figure 7 and which is generally indicated at 16. Generally, the blank 16 consists of an enlarged upper portion 17, a generally horizontally extending ovate plate 18 at the lower end of the blank and an interconnecting integrally formed neck portion 19. The portion 17 has its upper edge formed in a pair of upwardly extending ears 20 each of which is provided with a guide hole 21. The guide plate 18 is provided adjacent each of its edges with a guide hole 22.

From the blank 16 the spreader illustrated in Figures 3 and 6, for example, is formed by bending the neck 19 downwardly and outwardly and the plate downwardly and forwardly. Likewise the upper portion 17 is bent to a substantially cylindrical sleeve 23 and the ears 20 are brought to face-to-face relationship as shown, for example in Figures 1 and 3. It will be seen that in this position the openings 21 permit the wires 10 to slidably extend therethrough and through the sleeve 23 and thence downwardly through the guide openings 22 in the plate 18. The plate 18 is centrally and horizontally slitted, as indicated at 24 and the intervening strip 25 thus formed extends downwardly to form an eye whereby a snap fastener generally indicated at 26 may be attached thereto in order that a sinker or the like may be affixed to the device.

In operation, it will be apparent that when the spreading device illustrated in Figure 3 is moved upwardly, that is to say toward the fish line 13, the wires 10 and in the case of the form of the invention illustrated in Figure 2, the wires 10 and 10a, will move away from each other at their lower ends thus spreading the fish hook 15 apart. It will also be apparent that the spreading device may be moved downwardly to bring the fish hooks 15 closer together. Likewise it will be apparent that the openings 21 and 22 will act as guide members for the wires and impart sufficient grip action thereto to hold the spreading device in any given position. It will also be seen that the snap fastener 26, being centrally attached to the underside of the plate 18, will act as a balanced type of sinker for all of the hooks which may be attached to the device.

While but two forms of the invention have been shown and described herein, it will be readily apparent to those skilled in the art that many minor modifications may be made without departing from the spirit of the invention or the scope of the appended claims.

What is claimed is:

1. A device of the character described comprising a multiplicity of leaders connected together at one of their ends, means for attaching a fish hook to the other end of each of said leaders, and means for selectively spacing the said other ends from one another, said means comprising a cylindrical sleeve closely surrounding said leaders, a neck formed integrally with the lower end of said sleeve and extending downwardly and outwardly therefrom, a guide plate formed integrally with the lower end of said neck and extending downwardly and forwardly therefrom, said plate having an opening therethrough for the passage of each of said leaders, and guide means for said leaders in the upper end of said sleeve, said last-mentioned means comprising openings in the upper end of said sleeve each adapted to receive therethrough one of said leaders, the upper end of said sleeve having integrally formed therewith a pair of ears bent to face-to-face relationship, said openings in said sleeve being positioned immediately adjacent said ears.

2. A device as defined in claim 1 wherein means is provided in said guide plate for attaching a sinker thereto.

References Cited in the file of this patent

UNITED STATES PATENTS

| | | |
|---|---|---|
| 2,577,143 | Midland | Dec. 4, 1951 |
| 2,729,911 | Leverth | Jan. 10, 1956 |